US012440710B2

(12) United States Patent
Di Monte

(10) Patent No.: US 12,440,710 B2
(45) Date of Patent: Oct. 14, 2025

(54) FALL PREVENTION GUARD MODULAR SYSTEM

(71) Applicant: Michael Anthony Di Monte, Highlands, NJ (US)

(72) Inventor: Michael Anthony Di Monte, Highlands, NJ (US)

( * ) Notice: Subject to any disclaimer, the term of this patent is extended or adjusted under 35 U.S.C. 154(b) by 154 days.

(21) Appl. No.: 18/229,221

(22) Filed: Aug. 2, 2023

(65) Prior Publication Data

US 2025/0041635 A1 Feb. 6, 2025

(51) Int. Cl.
*A62B 35/00* (2006.01)

(52) U.S. Cl.
CPC ................................ *A62B 35/0068* (2013.01)

(58) Field of Classification Search
CPC .................................................. A62B 35/0068
See application file for complete search history.

(56) References Cited

U.S. PATENT DOCUMENTS 2,099,116 A * 11/1937 Kalmbach ................. B66C 1/66
411/401
5,346,036 A * 9/1994 Arisman ............. E04G 21/3261
248/200.1
5,699,875 A * 12/1997 Dugan ............... A62B 35/0068
52/27
10,722,738 B2 * 7/2020 Heinen .............. A62B 35/0068
10,940,338 B1 * 3/2021 Miller ................ A62B 35/0068
2005/0076601 A1 * 4/2005 Meadowcroft ..... E04G 21/3223
52/633
2014/0060967 A1 * 3/2014 Patton ................ A62B 35/0068
182/3
2020/0276463 A1 * 9/2020 Newing ................ E04G 21/329
2023/0021139 A1 * 1/2023 Kzeer ................ A62B 35/0068

* cited by examiner

*Primary Examiner* — Bradley Duckworth

(57) ABSTRACT

A reusable fall prevention system, comprises a guard post further comprising a guard post body, an anchor end and a free end opposing to the anchor end, wherein one or more key protrusions formed the anchor end, and wherein at least one guard post body pinhole is formed on the guard post body; a housing further comprising an inner space encompassed by a top, a bottom and a wall, wherein a guard post aperture is formed on the top, wherein at least one key aperture is further formed on the top; a torque stop further comprising a body, one or more legs extending from the body configured to fit into the at least one key aperture, and at least one torque stop pinhole; and at least a pin to pass through the at least one guard post body pinhole and the at least one torque stop pinhole.

9 Claims, 14 Drawing Sheets

FALL PREVENTION GUARD MODULAR SYSTEM

CROSS-REFERENCE RELATED TO RELATED APPLICATIONS

The current application.

FIELD OF THE INVENTION

This invention generally relates to fall prevention and more specifically, to fall prevention systems for use in a construction environment to protect workers from falls when working at heights.

BACKGROUND

A variety of fall prevention systems have been developed for use in a construction environment to protect workers from falls when working at heights that have an anchor, where the anchor can be secured to a building structure and where the anchor is disposable and a post where the post can be attached to the anchor and extend out of the anchor. The current fall prevention systems on the market are undesirable because they are threaded on the post and screwed into the anchor and as a result if the threads are damaged the entire post is not usable Another undesirable situation with the current products available on the market is the threads limit how much pull out force the post can withstand before failing and because for reusable systems constant threading and unthreading can wear the post threads down which reduces the strength capacity to an unknown amount without subjecting the threads to extensive or expensive testing if reusing the post is desired.

Another undesirable situation with the current products available on the market is the cost of producing threads and the waste required to produce the components is costly and requires more energy to produce.

BRIEF DESCRIPTION OF THE DRAWINGS

It should be noted that the drawings are merely representative, are not necessarily drawn to scale, and are not intended to limit the scope of the present invention.

DETAILED DESCRIPTION

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Wherein a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction. It must be noted that as used herein and in the appended claims, the singular forms "a", "an", and "the" may also include the plural referents unless the context clearly dictates otherwise. It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Figure 1:
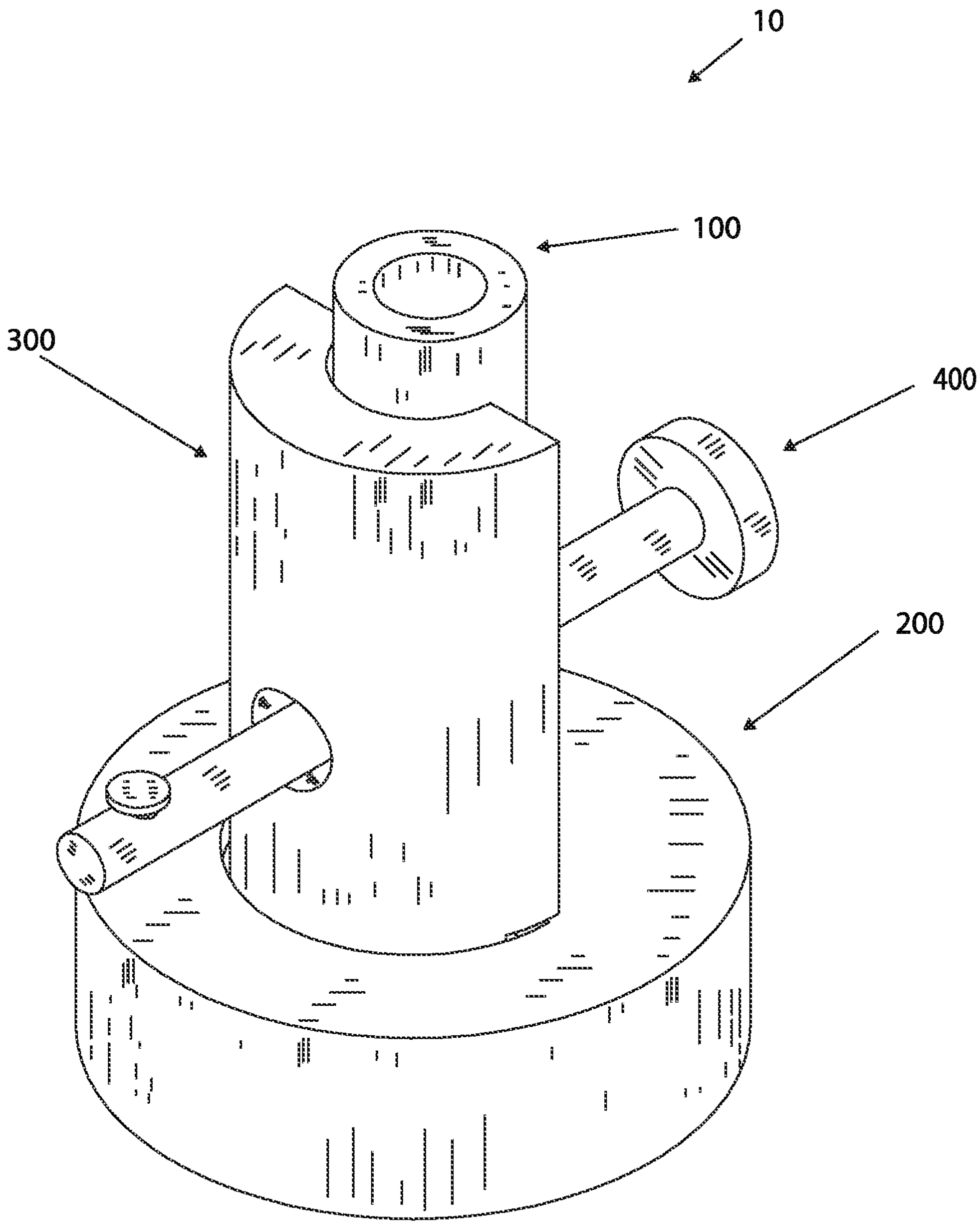
FIG. 1 is a perspective view of one embodiment of a fall prevention system.
Figure 2:
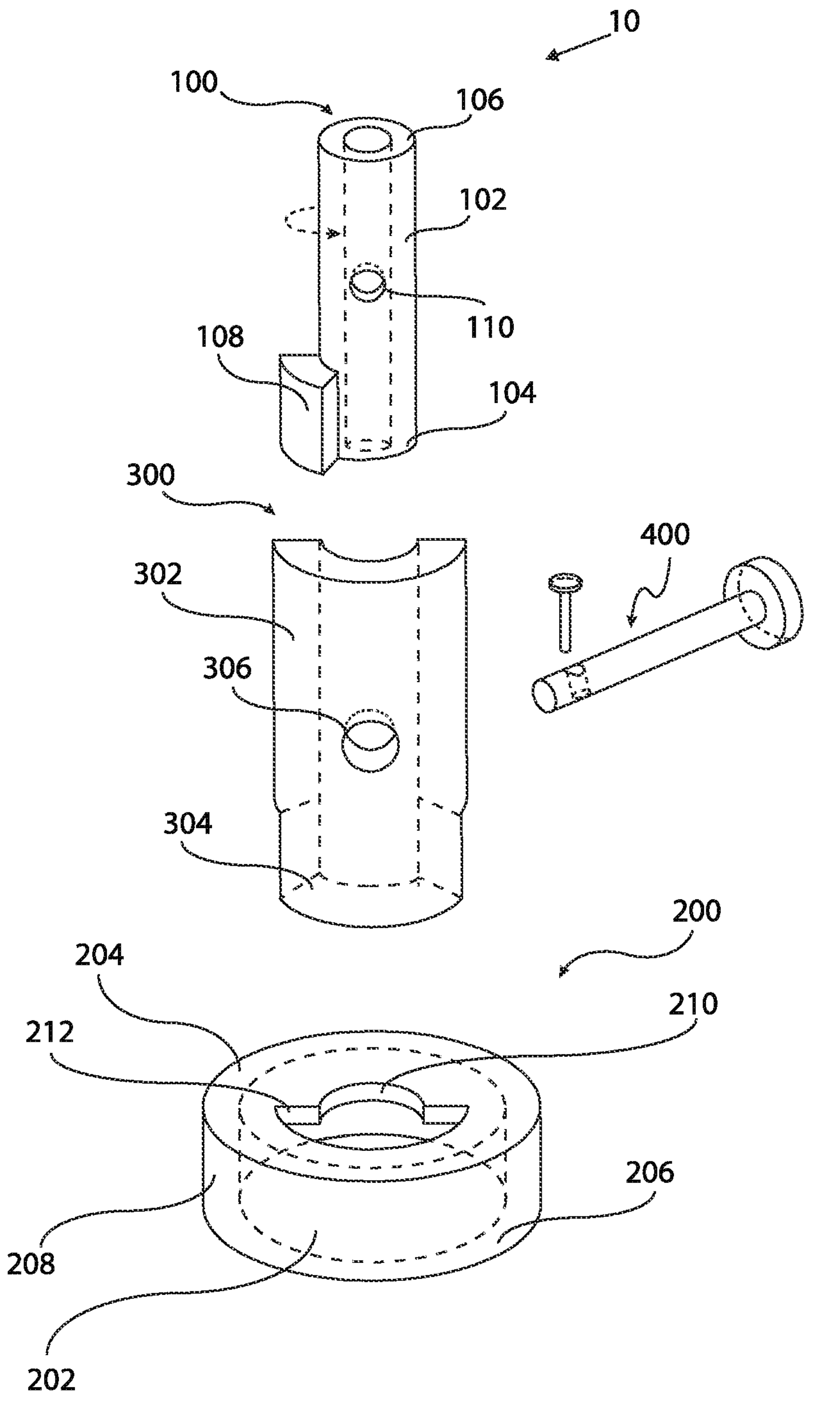
FIG. 2 is an explosive and prospective view of one embodiment of a fall prevention system.

The disclosure is related to a reusable fall prevention system. As shown in FIGS. 1 and 2, in one embodiment of the invention, reusable fall prevention system 10 comprises a guard post 100 further comprising a guard post body 102, an anchor end 104 and a free end 106 opposing to the anchor end 104, wherein one or more key protrusions 108 formed at the anchor end 104, and wherein at least one guard post body pinhole 110 is formed on the guard post body of the guard post; a housing 200 further comprising an inner space 202 encompassed by a top 204 of the housing, a bottom 206 of the housing and a wall 208 of the housing, wherein a guard post aperture 210 is formed on the top 204 of the housing 200 to allow the anchor end 104 of the guard post 100 to access to the inner space 202 in the housing 200, wherein at least one keyhole 212 is further formed on the top 204 of the housing 200 adjacent to the guard post aperture 210 and is configured to allow the one or more key protrusions 108 of the guard post 100 to pass through the at least one key aperture 212, wherein the guard post 100 can be turned to configure the one or more key protrusions 108 biased from the at least one key aperture 212 after the anchor end 104 of the guard post 100 is disposed in the inner space 202 of the housing 200; a torque stop 300 further comprising a body 302, one or more legs 304 extending from the body configured to fit into the at least one key aperture 212, and at least one torque stop pinhole 306 configured to aligned with the at least one guard post body pinhole 110 when the one or more legs 304 of the torque stop 300 is disposed in the at least one key aperture 212; and at least a pin 400 to pass through the at least one guard post body pinhole 110 and the at least one torque stop pinhole 306 when the at least one torque stop pinhole 306 is aligned with the at least one guard post body pinhole 110.

Figure 3:
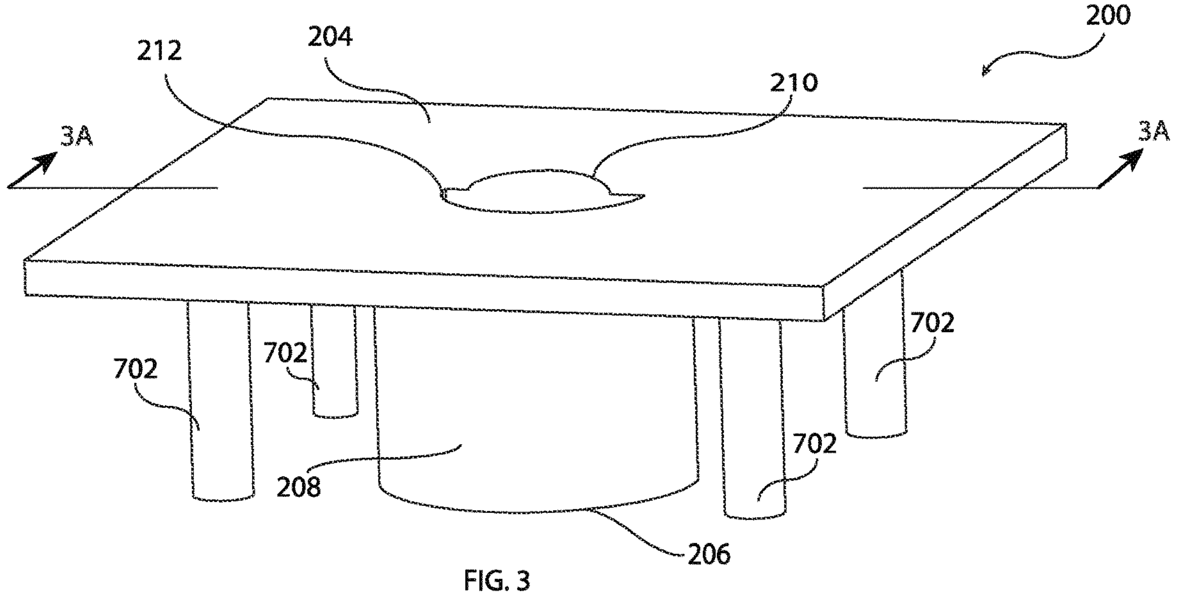
FIG. 3 is a perspective view of one embodiment of a housing comprising an enlarged top.
Figure 3A:
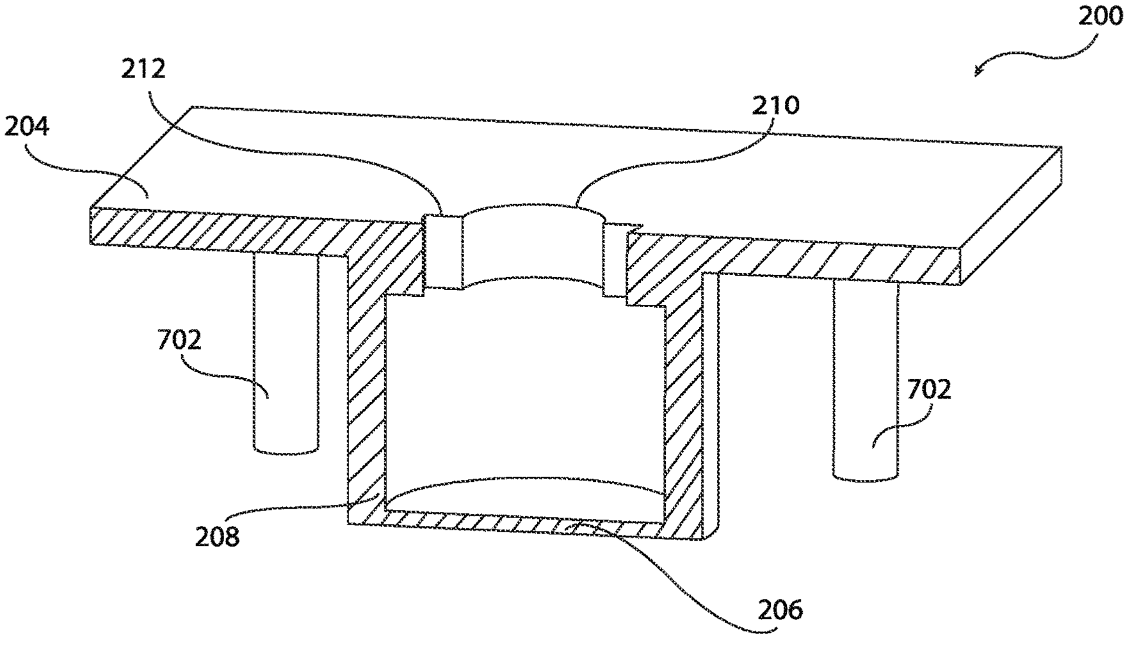
FIG. 3A is a perspective, sectional view of one embodiment of a housing comprising an enlarged top.
Figure 13:
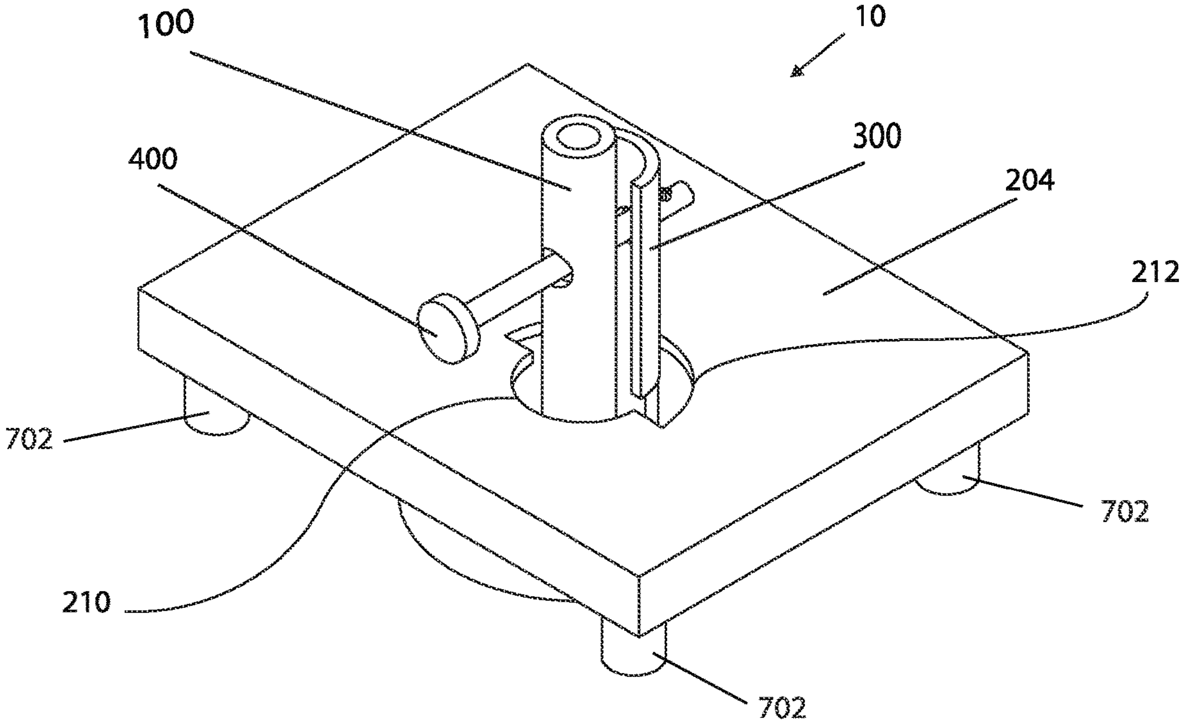
FIG. 13 is a perspective view of another embodiment of a fall prevention system comprising an enlarged top of the housing.
Figure 14:
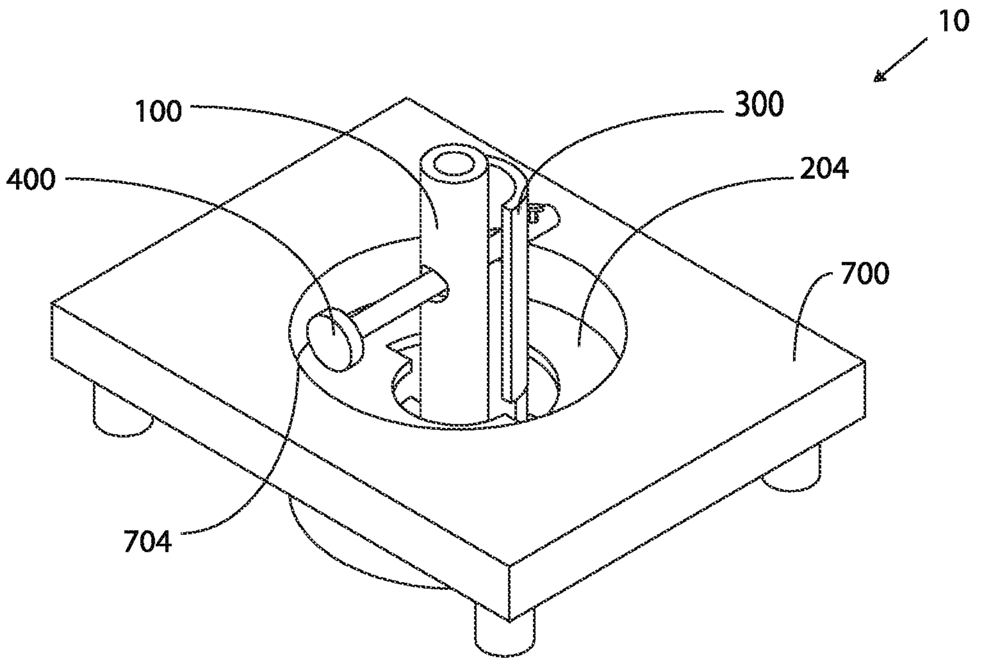
FIG. 14 is a perspective view of another embodiment of a fall prevention system comprising an anchor plate.

As shown in FIGS. 3, 3A, and 13, in one embodiment of the invention, the top 204 of the housing 200 of the reusable fall prevention system 10 further comprises at least one peg 702 extending from the top 204 of the housing 200 when the top 204 is configured greater than the bottom 206 of the housing 200. The direction of the at least one peg 702 is normally, but not limited to, toward a surface or structure to which the at least one peg 702 is to be affixed.

Figure 4:
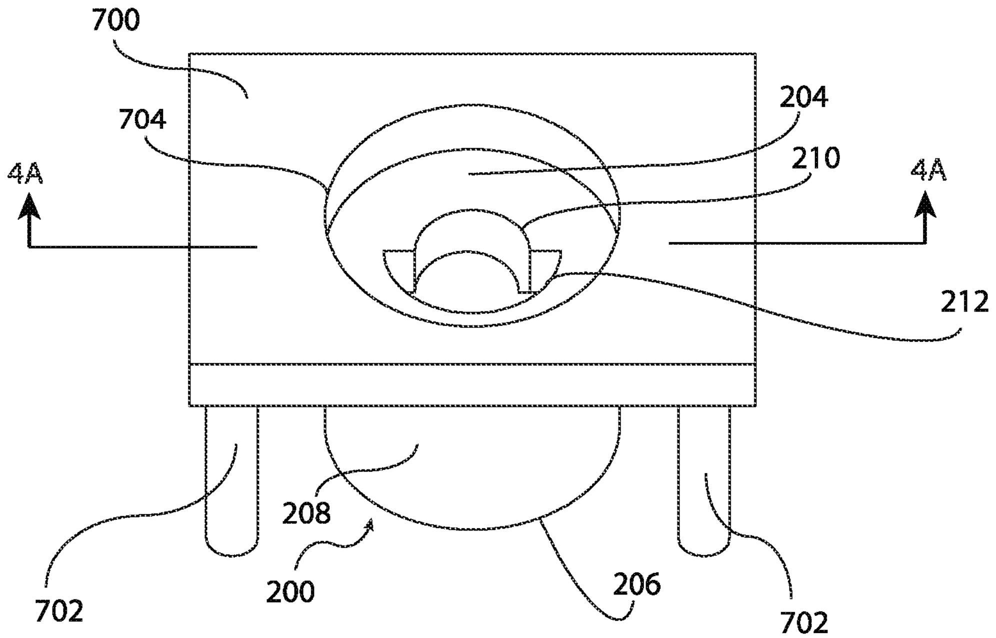
FIG. 4 is a perspective view of one embodiment of an anchor plate configure above the top of the housing of the fall prevention system.
Figure 4A:
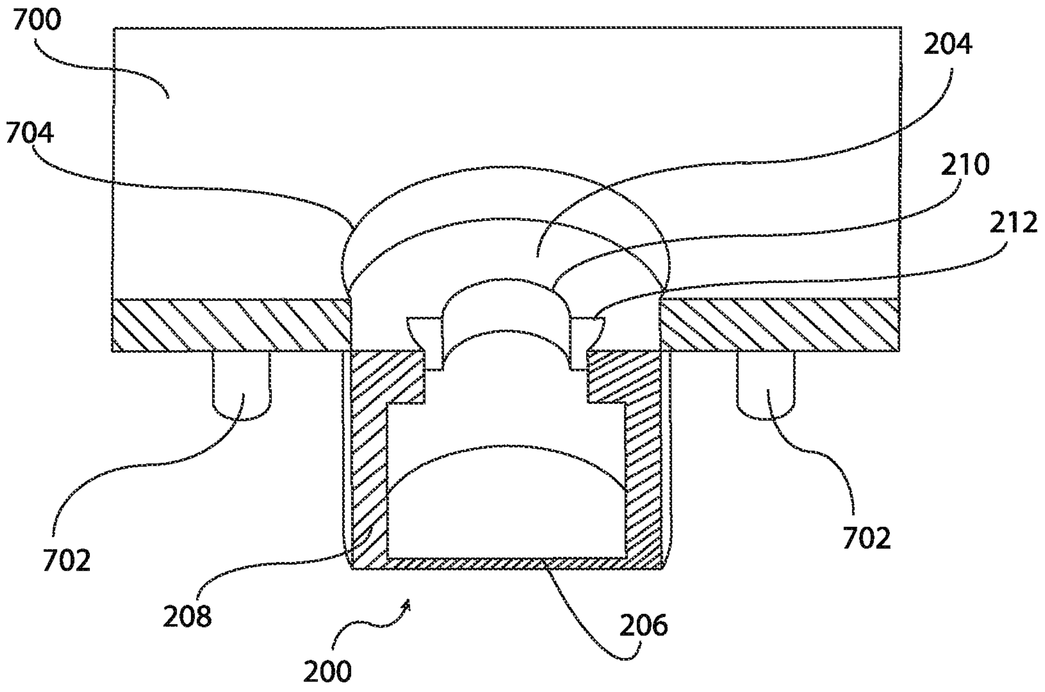
FIG. 4A is a perspective, sectional view of one embodiment of an anchor plate configure above the top of the housing of the fall prevention system.
Figure 10:
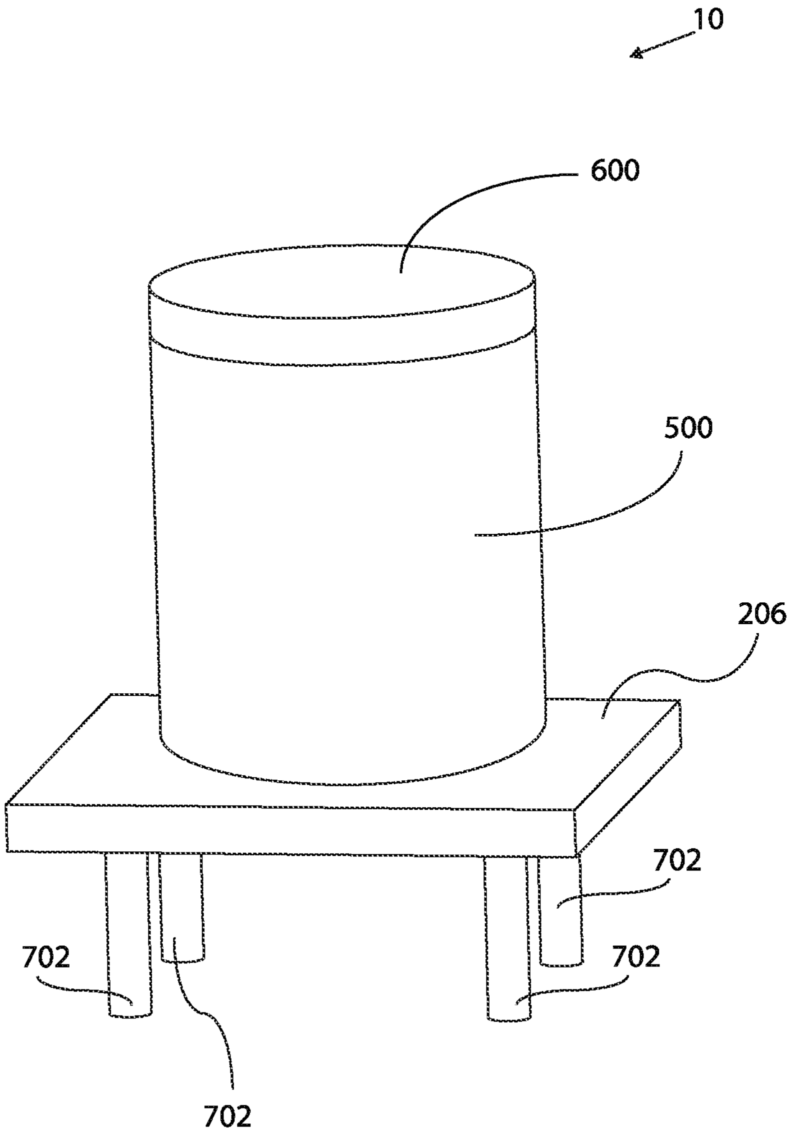
FIG. 10 is a perspective view of another embodiment of a fall prevention system further comprising a sleeve residing on the bottom of the housing.

As shown in FIGS. 4, 4A, and 10, in one embodiment of the invention, a reusable fall prevention system 10, further comprises an anchor plate 700 and at least one peg 702 extending from the anchor plate 700, wherein the anchor plate 700 is attached to the top 204 of the housing 200, wherein an opening 704 is formed on the anchor plate 700, and wherein the opening 704 is in a size allowing the anchor end 104 with one or more key protrusions 108 of the guard post body 102 can pass through the opening 704 to reach the guard post aperture 210 and the at least one key aperture 212. The opening 704 can be configured as the same shape, size, and direction as the guard post aperture 210 and the at least one key aperture 212 together. However, the opening 704 can also be configured to any shape or dimension as long as the size of the opening 704 can accommodate the shape and dimensions of the guard post aperture 210 and the at least one key aperture 212 in order to allow the anchor end 104 of the guard post 100 with the one or more key protrusions 108 to pass the opening 704 and reach the guard post aperture 210 and the at least one key aperture 212. The direction of the at least one peg 702 is normally, but not limited to, toward the surface on which the reusable fall prevention system 10 to reside.

Figure 5:
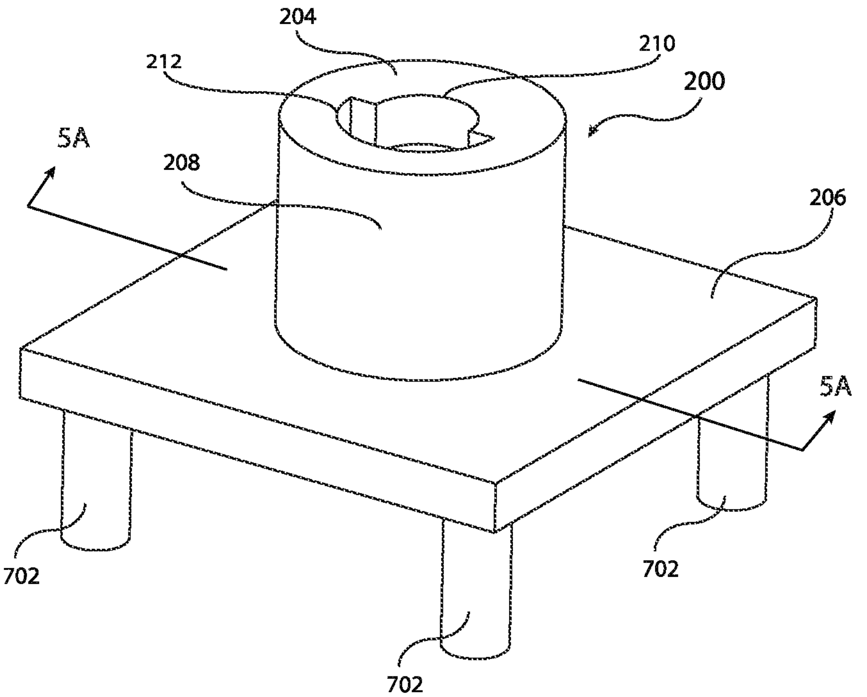
FIG. 5 is a perspective view of one embodiment of a housing comprising an enlarged bottom.
Figure 5A:
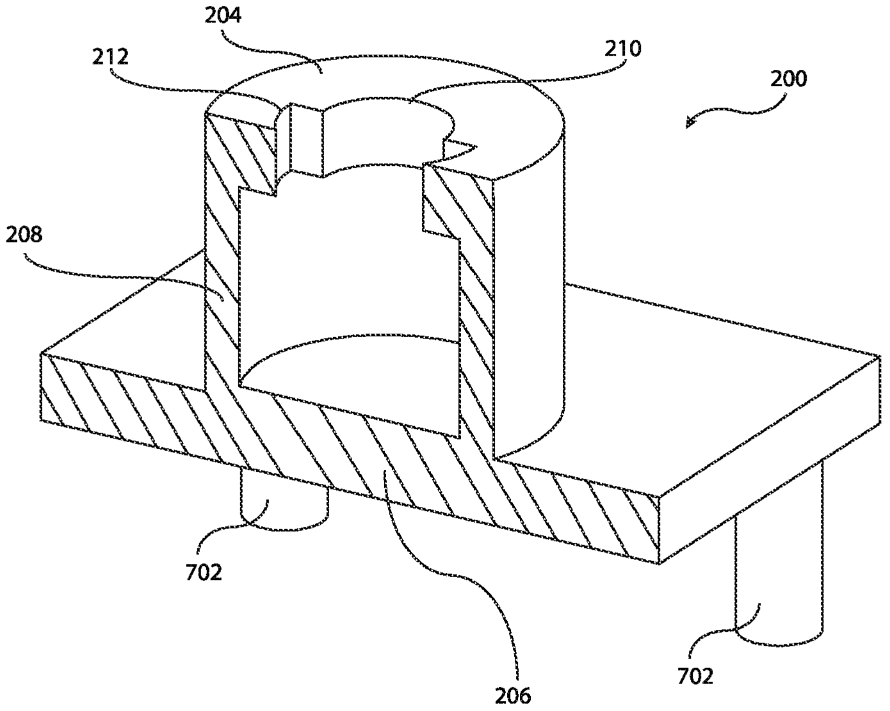
FIG. 5A is a perspective, sectional view of one embodiment of a housing comprising an enlarged bottom.

As shown in FIGS. 5 and 5A, in one embodiment of the invention, the bottom 206 of the housing 200 of the reusable fall prevention system 10 further comprises at least one peg 702 extending from the bottom 206 of the housing 200 when the bottom 206 is configured greater than the top 204 of the housing 200. The direction of the at least one peg 702 is normally, but not limited to, toward a surface or structure to which the at least one peg 702 is to be affixed.

Figure 6:
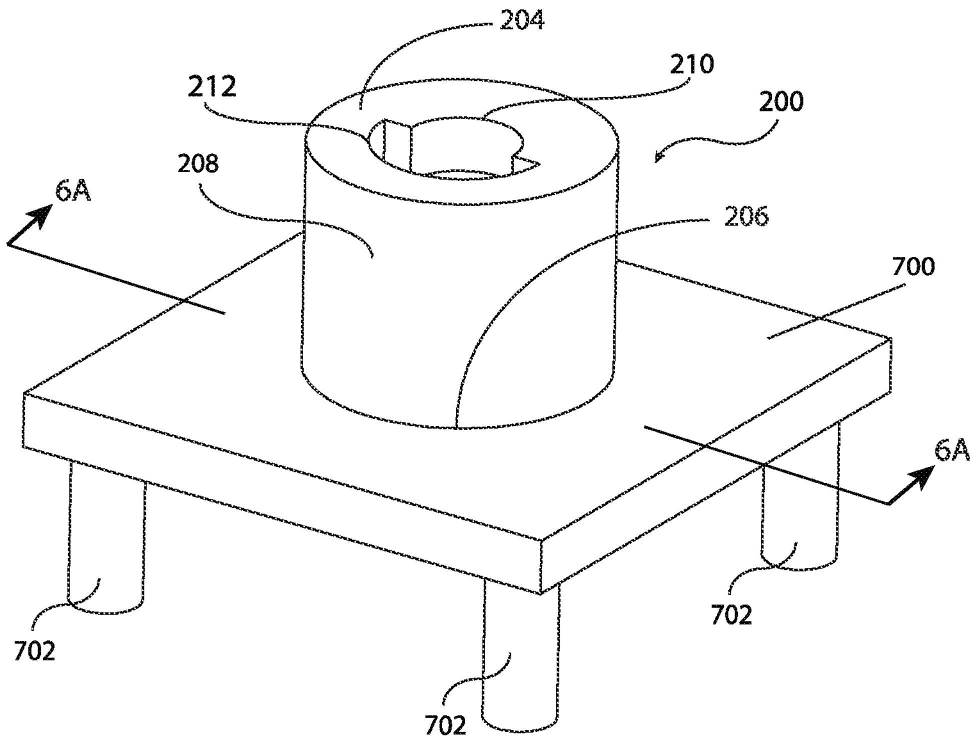
FIG. 6 is a perspective view of one embodiment of an anchor plate configured below the bottom of the housing of the fall prevention system.
Figure 6A:
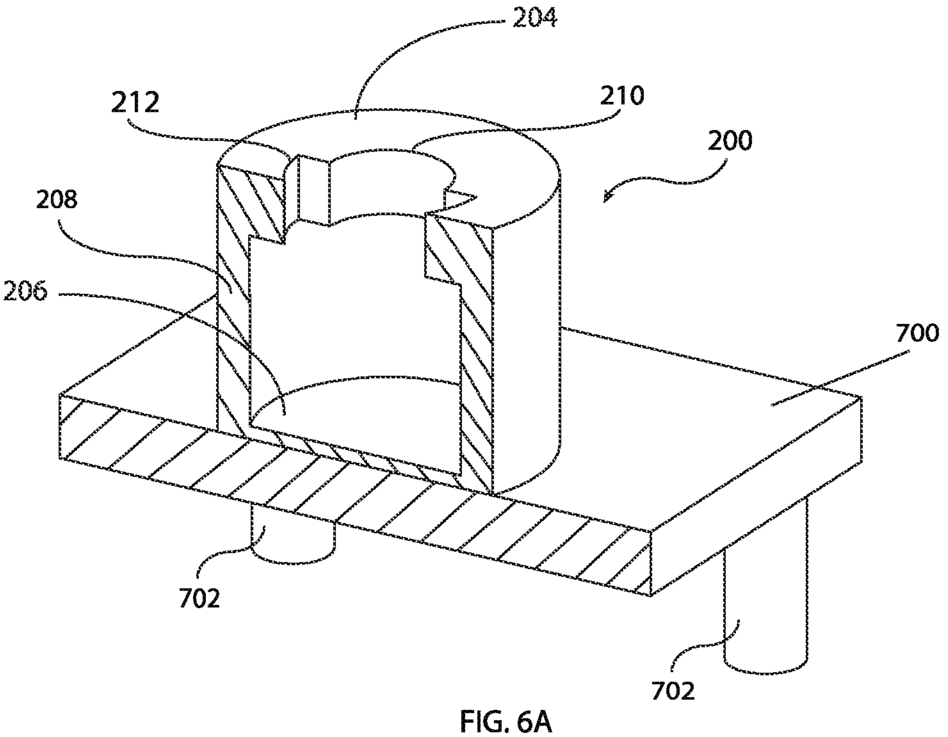
FIG. 6A is a perspective, sectional view of one embodiment of an anchor plate configured below the bottom of the housing of the fall prevention system.

As shown in FIGS. 6 and 6A, in one embodiment of the invention, the reusable fall prevention system 10, further comprises an anchor plate 700 and at least one peg 702 extending from the anchor plate 700, and wherein the anchor plate 700 is attached to the bottom 206 of the housing 200.

Figure 7:
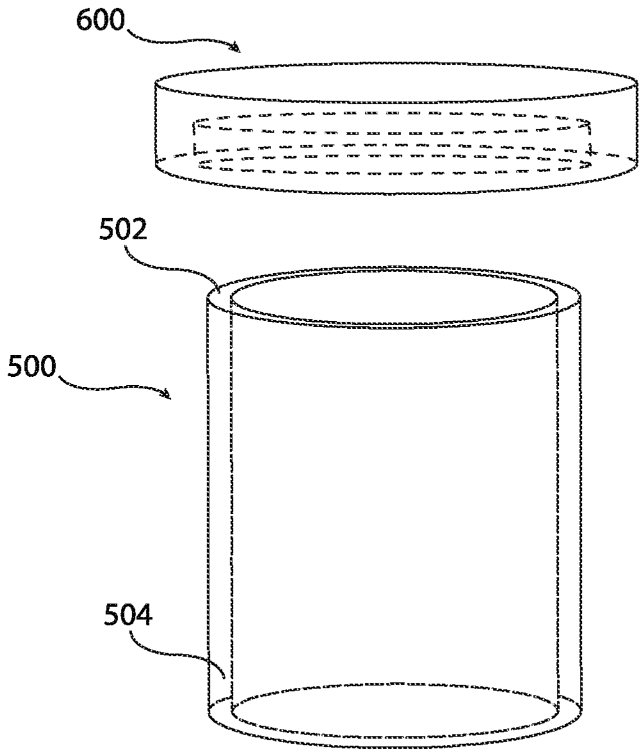
FIG. 7 is a perspective view of one embodiment of the sleeve and the cap of a fall prevention system further comprising a sleeve and a cap.
Figure 8:
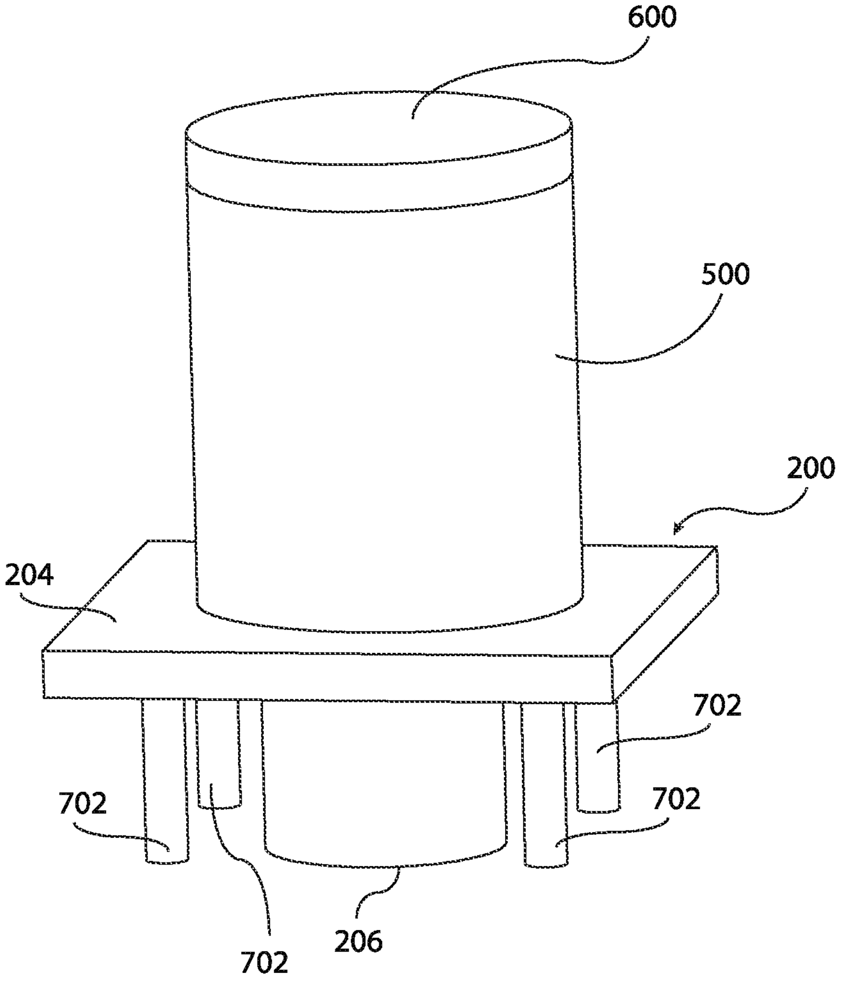
FIG. 8 is a perspective view of another embodiment of a fall prevention system further comprising a sleeve residing on the top of the housing.
Figure 9:
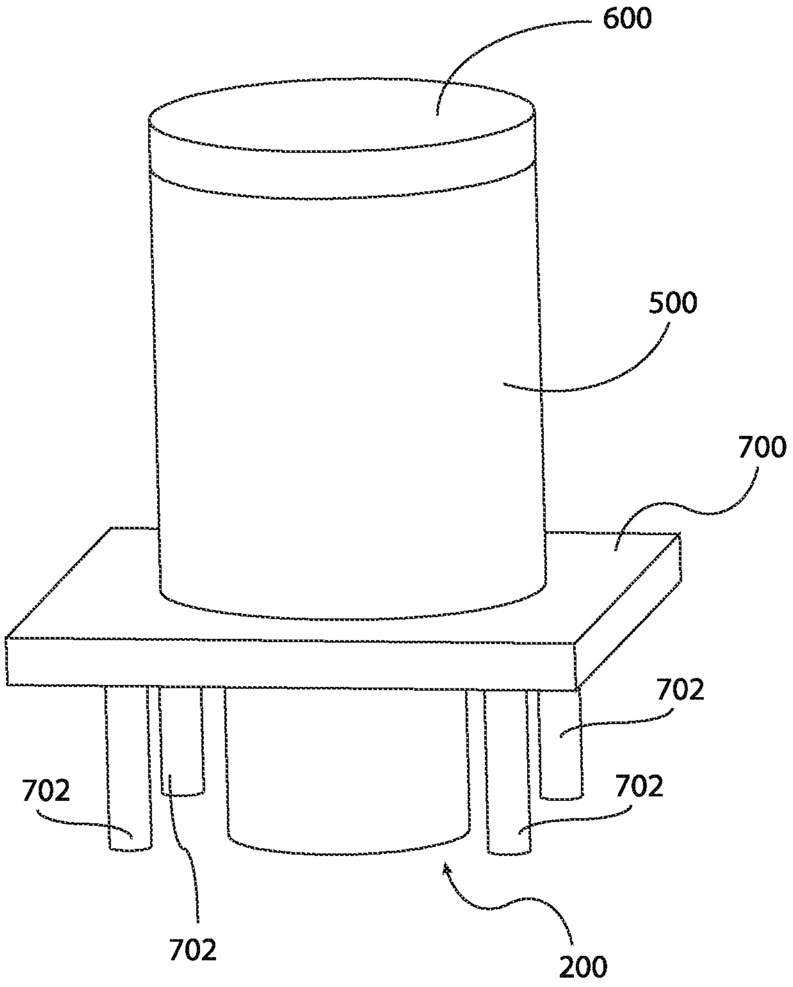
FIG. 9 is a perspective view of another embodiment of a fall prevention system further comprising a sleeve residing on the anchor plate.
Figure 11:
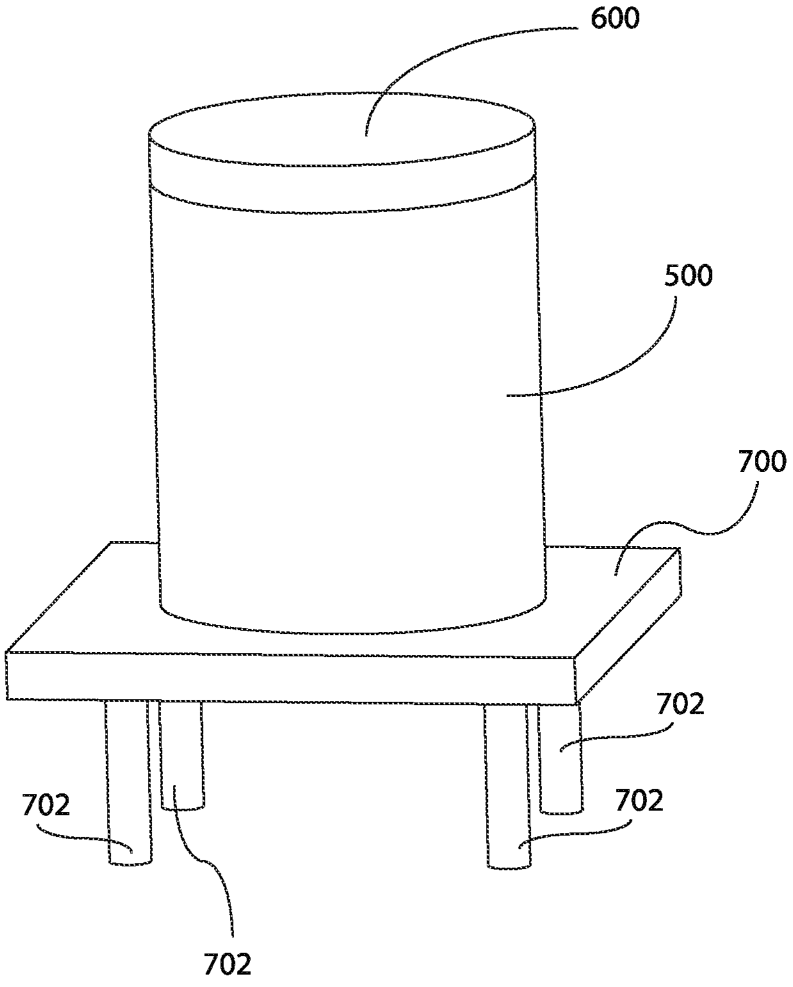
FIG. 11 is a perspective view of another embodiment of a fall prevention system further comprising a sleeve residing on the anchor plate.

As shown in FIG. 7, in one embodiment of the invention, the reusable fall prevention system 10 further comprises a sleeve 500 having a top end 502 and a bottom end 504, and a cap 600. As shown in FIG. 8, in one embodiment of the invention, the sleeve 500 can be attached on or detached from the top 204 of the housing 200. As shown in FIG. 9, in one embodiment of the invention, the sleeve 500 can be attached on or detached from the anchor plate 700. As shown in FIG. 10, in one embodiment of the invention, the sleeve 500 can be attached on or detached from the bottom 206 of the housing 200. As shown in FIG. 11, in one embodiment of the invention, the sleeve 500 can be attached on or detached from the anchor plate 700. As shown in FIGS. 7 to 11, the cap 600 can be attached or detached from the sleeve 500.

Figure 12:
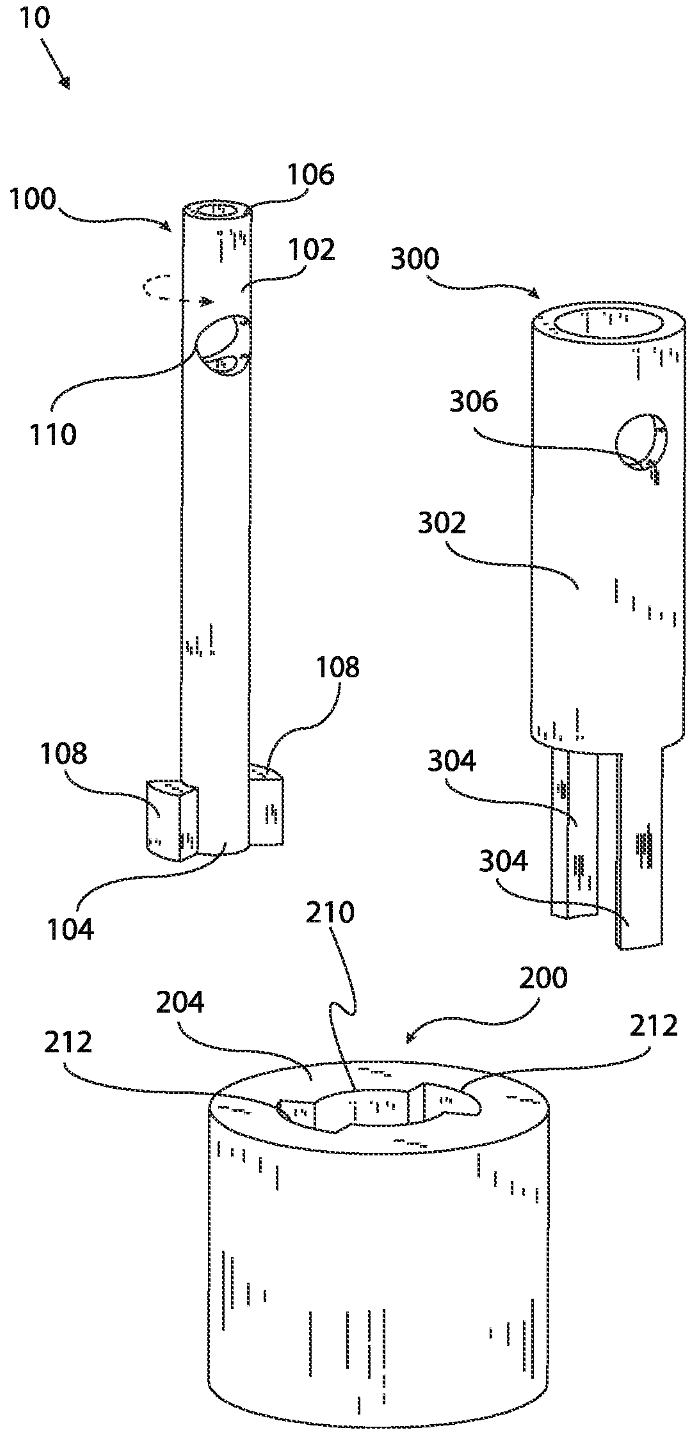
FIG. 12 is a perspective view of another embodiment of a fall prevention system.

As shown in FIG. 12, in one embodiment of the invention, two key protrusions 108 are formed at the anchor end 104 of the guard post 100, two legs 304 are extending from the body 302, which is in a shape of a hollow cylinder, in a shape of a pipe, and two key aperture 212 are formed on the top 204 of the housing 200.

As the embodiments shown in FIGS. 1 through 13, the torque stop 300 may be embodied by configuring the torque stop 300 in different geometrical shapes by a person having ordinary skills in the art as long as the torque stop 300 having a member that can be attached to the guard post body 102 and a member can be used to stop the guard post 100 being turned and pulled out of the housing 200. The embodiments of torque stop 300 can be in a shape of shell, spherical prism, rectangular prism, a ring, a hollow cylinder, in a shape of a pipe, and any shape as long as it can be attached with a section of the guard post body 102, partially or fully. The embodiments of guard post body 102 can be a solid rod or a pipe. The embodiments of the at least a pin 400 may be any forms of pin, or equivalent mechanical widgets that can be used to lock the guard post 100 in place, such as clips, locks, fasteners, nails, screws, bolts, clamps, clipper, or spring locks.

To install one embodiment of the reusable fall prevention system 10, the housing 200 or the at least one peg 702 of the anchor plate 700 is to be affixed with a structure of a foundation or a building. The anchor end 104 of the guard post 100 is to be inserted into the inner space 202 in the housing 200 by fitting the one or more key protrusions 108 through the at least one key aperture 212 and turning the guard post 100 to cause the one or more key protrusions 108 away from the at least one key aperture 212. To prevent the anchor end 104 of the guard post 100 from being turned and pulled out from the housing, torque stop 300 is to be fitted to the guard post body 102 when the one or more legs 304 of the torque stop 300 being inserted to the at least one key aperture 212. The torque stop 300 then is secured to the guard post body 102 by fitting the at least a pin 400 through the at least one guard post body pinhole 110 and at least one torque stop pinhole 306, which are configure to be aligned when the when the one or more legs 304 of the torque stop 300 being inserted to the at least one key aperture 212. To uninstalled the reusable fall prevention system 10, the at least a pin 400 is pulled out of the at least one guard post body pinhole 110 and at least one torque stop pinhole 306, then the torque stop 300 is removed from the guard post body 102 and the at least one key aperture 212. Lastly, turn the guard post 100 to cause the one or more key protrusions 108 being aligned with the at least one key aperture 212, and pull out the anchor end 104 of the guard post 100 from the inner space 202 of the housing 200. The housing 200 or the anchor plate 700 is to be remained affixed to the structure of the foundation of the building.

To install one embodiment of the invention the top end 502 of the sleeve 500 can be flush with finished concrete floor level and the cap 600 can be attached to the sleeve to prevent debris from entering inside the sleeve to protect the reusable fall prevention system 10.

To install one embodiment of the invention the top end 502 of the sleeve 500 can be above the finished concrete floor level and the cap 600 can be attached to the sleeve to prevent debris from entering inside the sleeve to protect the reusable fall prevention system 10 and the sleeve 500 can be cut to a desired height.

What is claimed:

1. A reusable fall prevention system, comprising:

a. a guard post further comprising a guard post body, an anchor end and a free end opposing to the anchor end, wherein one or more key protrusions formed at the anchor end, and wherein at least one guard post body pinhole is formed on the guard post body of the guard post;

b. a housing further comprising an inner space encompassed by a top of the housing, a bottom of the housing and a wall of the housing, wherein a guard post aperture is formed on the top of the housing to allow the anchor end of the guard post access to the inner space in the housing, wherein at least one key aperture is further formed on the top of the housing adjacent to the guard post aperture and is configured to allow the one or more key protrusions of the guard post to pass through the at least one key aperture, wherein the guard post can be turned to configure the one or more key protrusions out of alignment from the at least one key aperture after the anchor end of the guard post and the one or more key protrusions are inserted through the at least one key aperture to be disposed in the inner space of the housing;

c. a torque stop further comprising a body, one or more legs extending from the body configured to fit into the at least one key aperture, and at least one torque stop pinhole configured to be aligned with the at least one guard post body pinhole when the one or more legs of the torque stop is disposed in the at least one key aperture; and d. at least a pin to pass through the at least one guard post body pinhole and the at least one torque stop pinhole when the at least one torque stop pinhole is aligned with the at least one guard post body pinhole.

2. The reusable fall prevention system in claim 1, further comprising an anchor plate and at least one peg extending from the anchor plate, wherein the anchor plate is attached to the top of the housing, wherein an opening is formed on the anchor plat, and wherein the opening is in a size allowing the anchor end with one or more key protrusions of the guard post body to pass through the opening to reach the guard post aperture and the at least one key aperture.

3. The reusable fall prevention system in claim 2, further comprising a sleeve having a top end and a bottom end, and a cap, wherein the bottom end of the sleeve can be attached on or detached from the anchor plate, and wherein the cap can be attached on or detached from the top end of the sleeve.

4. The reusable fall prevention system in claim 1, further comprising an anchor plate and at least one peg extending from the anchor plate, and wherein the anchor plate is attached to the bottom of the housing.

5. The reusable fall prevention system in claim 4, further comprising a sleeve having a top end and a bottom end, and a cap, wherein the bottom end of the sleeve can be attached on or detached from the anchor plate, and wherein the cap can be attached on or detached from the top end of the sleeve.

6. The reusable fall prevention system in claim 1, further comprising at least one peg extending from the top of the housing, wherein the top of the housing is greater than the bottom of the housing, and wherein the at least one peg extends toward a surface to which the at least one peg is fixed.

7. The reusable fall prevention system in claim 6, further comprising a sleeve having a top end and a bottom end, and a cap, wherein the bottom end of the sleeve can be attached on or detached from the top of the housing, and wherein the cap can be attached on or detached from the top end of the sleeve.

8. The reusable fall prevention system in claim 1, further comprising at least one peg extending from the bottom of the housing, wherein the bottom of the housing is greater than the top of the housing, and wherein the at least one peg extends toward a surface to which the at least one peg is fixed.

9. The reusable fall prevention system in claim 8, further comprising a sleeve having a top end and a bottom end, and a cap, wherein the bottom end of the sleeve can be attached on or detached from the bottom of the housing, and wherein the cap can be attached on or detached from the top end of the sleeve.

* * * * *